United States Patent
Kim et al.

(10) Patent No.: US 7,624,588 B2
(45) Date of Patent: Dec. 1, 2009

(54) HYBRID ABSORPTION CHILLER

(75) Inventors: Moo Hwan Kim, Gyeongsangbuk-do (KR); Jae Dal Lee, Gyeongsangbuk-do (KR)

(73) Assignees: Postech Academy Industry Corp., Gyeongsangbuk-do (KR); Posco, Gyeongsangbuk-do (KR)

( * ) Notice: Subject to any disclaimer, the term of this patent is extended or adjusted under 35 U.S.C. 154(b) by 330 days.

(21) Appl. No.: 11/394,210

(22) Filed: Mar. 31, 2006

(65) Prior Publication Data

US 2007/0204638 A1  Sep. 6, 2007

(30) Foreign Application Priority Data

Mar. 6, 2006 (KR) .................... 10-2006-0020823

(51) Int. Cl.
*F25B 27/00* (2006.01)
*F25D 23/00* (2006.01)

(52) U.S. Cl. .................................. 62/238.3; 62/271

(58) Field of Classification Search ............... 62/93, 62/94, 271, 171, 114, 112, 238.3, 304, 476, 62/485, 494, 497, 430, 434
See application file for complete search history.

(56) References Cited

U.S. PATENT DOCUMENTS 5,916,251 A * 6/1999 Sibik ........................ 62/148
5,946,937 A * 9/1999 Kujak ....................... 62/476
6,335,403 B1 * 1/2002 Shimizu et al. ............ 526/74

* cited by examiner

*Primary Examiner*—Mohammad M Ali
(74) *Attorney, Agent, or Firm*—Morgan Lewis & Bockius LLP (57) ABSTRACT

The present invention relates to hybrid absorption chiller, which uses high-temperature steam and medium-temperature water generated in industrial processes as a heat source, the hybrid absorption chiller including a high temperature generator that uses the high-temperature steam as a heat source so that the heat exchange with refrigerant is carried out; a low temperature generator that uses the heat of condensation of the refrigerant steam, generated in the high temperature generator, as a heat source so that the heat exchange with refrigerant is once again carried out; a generator for medium temperature water that uses the medium-temperature water as a heat source so that the heat exchange with refrigerant is carried out; a hybrid condenser that simultaneously condenses the refrigerants which are respectively heat-exchanged in the high temperature generator, the low temperature generator, and the generator for medium temperature water; an evaporator that uses latent heat of vaporization of the refrigerant condensed in the hybrid condenser so as to obtain chilled water; an absorber that receives a strong solution from the low temperature generator and the generator for medium temperature water and absorbs the refrigerant steam evaporated by obtaining latent heat of vaporization in the evaporator so as to produce a weak solution; and solution pumps that are installed in both sides of the absorber so as to supply the weak solution produced in the absorber to the high temperature generator and the generator for medium temperature water, respectively.

10 Claims, 10 Drawing Sheets

▶ Operation parameters for double effect

| Heat medium | Operation parameters | Time average values after chiller operation |
|---|---|---|
| | | From 60 to 150 minutes |
| 1) Chilled water | Inlet temperature (°C) | 24.9 |
| | Outlet temperature (°C) | 21.8 |
| | Volume flow rate (L/h) | 2996.0 |
| 2) Steam | Inlet temperature (°C) | 164.9 |
| | Outlet temperature (°C) | 143.7 |
| | Inlet pressure (kg/cm²A) | 7.6 |
| | Outlet pressure (kg/cm²A) | 4.3 |
| | Volume flow rate (m³/h) | 5.1 |
| 3) Cooling water | Inlet temperature (°C) | 31.3 |
| | Outlet temperature (°C) | 37.4 |
| | Volume flow rate (L/h) | 2998.4 |

▶ Operation parameters for combination of double & single effects

| Heat medium | Operation parameters | Time average values after chiller operation | Time average values after chiller operation |
|---|---|---|---|
| | | From 45 to 80 minutes | From 150 to 240 minutes |
| Operation | After operation start at 0 minutes | 2RT double effect only | 3RT combination |
| 1) Chilled water | Inlet temperature (°C) | 25.1 | 25.0 |
| | Outlet temperature (°C) | 23.0 | 22.0 |
| | Volume flow rate (L/h) | 3002.7 | 3000.3 |
| 2) Steam | Inlet temperature (°C) | 153.5 | 150.8 |
| | Outlet temperature (°C) | 127.7 | 125.9 |
| | Inlet pressure (kg/cm²A) | 5.7 | 5.3 |
| | Outlet pressure (kg/cm²A) | 2.7 | 2.6 |
| | Volume flow rate (m³/h) | 3.6 | 3.7 |
| 3) Hot-water | Inlet temperature (°C) | X | 88.4 |
| | Outlet temperature (°C) | X | 84.8 |
| | Volume flow rate (L/h) | X | 999.7 |
| 4) Cooling Water | Inlet temperature (°C) | 31.4 | 31.3 |
| | Outlet temperature (°C) | 35.7 | 37.2 |
| | Volume flow rate (L/h) | 3004.7 | 3001.7 |

HYBRID ABSORPTION CHILLER

CROSS-REFERENCE TO RELATED APPLICATIONS

The application claims the benefit of Korea Patent Application No. 2006-0020823 filed with the Korea Industrial Property Office on Mar. 6, 2006, the disclosure of which is incorporated herein by reference.

BACKGROUND OF THE INVENTION

1. Field of the Invention

The present invention relates to a hybrid absorption chiller which uses an aqueous lithium bromide solution as an absorbent and uses water as a refrigerant, and more specifically, to a hybrid absorption chiller in which generators which respectively use high-temperature steam and medium-temperature water, generated in an industrial process (steel manufacturing process), as a heat source are installed to generate a refrigerant at the same time, so that the production of refrigerant is increased and waste heat is effectively utilized.

2. Description of the Related Art

In a general steel manufacturing process, waste heat such as high-temperature steam and medium-temperature water is inevitably generated. As a method in which such waste heat is recovered and reused, a double-effect absorption chiller can be applied.

Roughly describing a double-effect absorption chiller, the absorption chiller using an aqueous lithium bromide solution as working fluid composes the following cooling cycle. The absorption chiller generates a primary refrigerant in a process where the aqueous lithium bromide solution is phase-changed into steam by high-temperature steam within a high temperature generator, and generates a secondary refrigerant in a process where the steam is supplied to a low temperature generator and is heat-exchanged. The respective refrigerants generated in the high and low temperature generators are condensed by a condenser and are then supplied to an evaporator so as to be evaporated. Further, the refrigerant is supplied to an absorber and is absorbed by an absorbent to produce a weak solution. The weak solution is preheated through two heat exchangers, that is, a high-temperature solution heat exchanger and a low-temperature solution heat exchanger, and is then concentrated in the high and low temperature generators.

Figure 1:
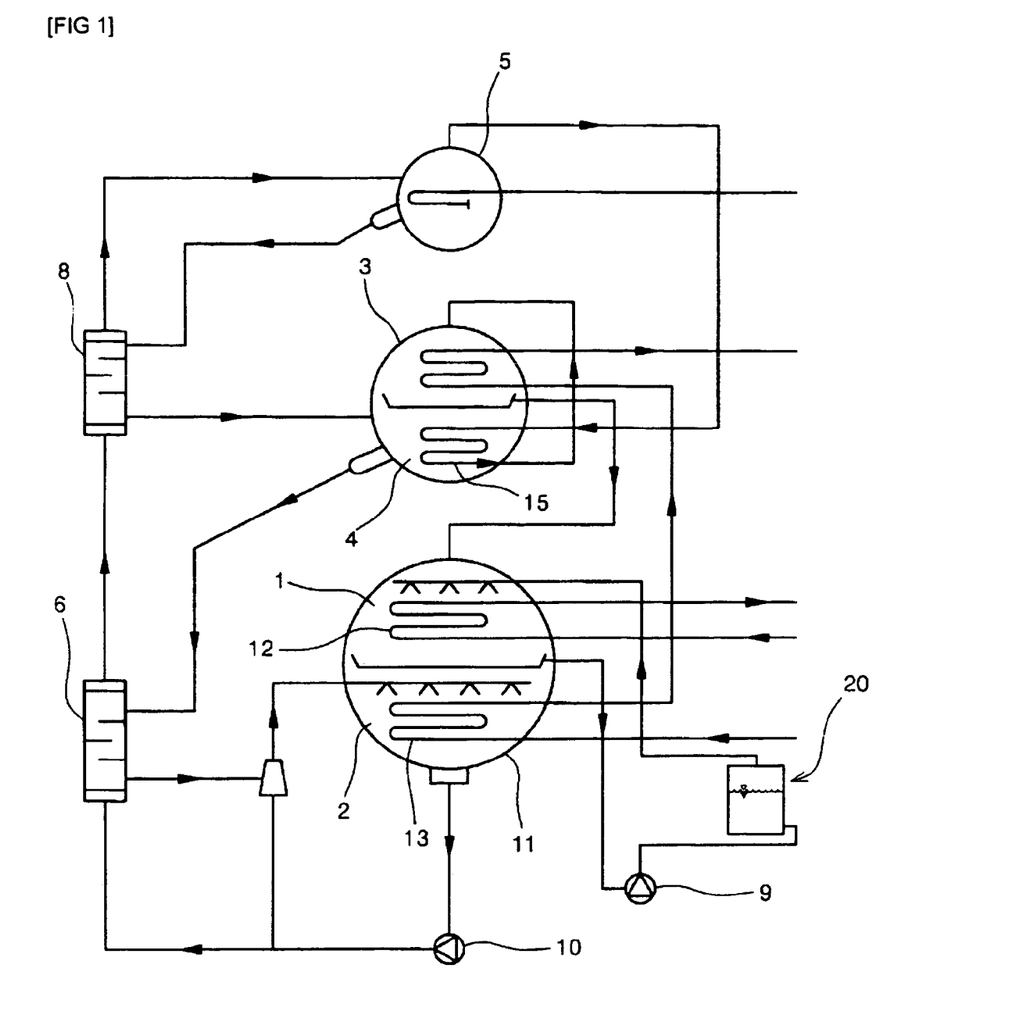
FIG. 1 is a conceptual view schematically showing the structure of a double-effect absorption chiller according to the related art.

FIG. 1 is a conceptual view schematically showing the structure of the double-effect absorption chiller according to the related art. As shown in FIG. 1, a refrigerant pump 9 and solution pump 10 are driven in accordance with an operation signal, and a rated operation is carried out after 20 to 30 minutes of activating operation time.

At this time, a lower shell 11 connected to the refrigerant pump 9 through a pipe maintains high vacuum of about 6 mmHg.

In such a lower shell 11, the water as a refrigerant supplied through the pipe is sprayed over an evaporator 1 through a nozzle. Inside the evaporator 1, a first tube 12 as a cooling water pipe in which cooling water flows is installed. While being sprayed over the cooling water pipe, the refrigerant takes latent heat of vaporization on the cooling water pipe and is evaporated so as to be absorbed by an absorber 2 in a state of refrigerant steam. The cooling water cooled down by taking the heat of the cooling water pipe is used in another equipment in which cooling is required.

In the absorber 2, the strong aqueous lithium bromide solution as a absorbent absorbs the refrigerant steam evaporated in the evaporator 1 so as to become a weak solution of which the concentration is dilute. When the refrigerant steam is absorbed by the strong aqueous lithium bromide solution, heat is generated. The heat causes the absorbed refrigerant to be again separated into steam. Such reaction heat is removed by a second tube 13 installed in the absorber 2 in which cooling water flows.

While the weak solution, which has become dilute by absorbing water, is passed through a low temperature heat exchanger 6 and a high temperature heat exchanger 8 by the solution pump 10 installed in the lower portion of the absorber 2, the temperature of the weak solution increases. Further, the weak solution is supplied to the high temperature generator 5.

The weak solution is heated in the high temperature generator 5 by a heat source (not shown) so as to be divided into refrigerant steam and a concentrated lithium bromide solution. The refrigerant steam is sent to the inside of a third tube 15 of the low temperature generator 4.

The solution concentrated in the high temperature generator 5 is heat-exchanged in the high-temperature heat exchanger 8 and is then sent to the low temperature generator 4. Further, the concentrated solution is heated by the refrigerant steam passing through the third tube 15 connected to the high temperature generator 5.

While the refrigerant steam generated in the low temperature generator 4 and the refrigerant steam generated in the high temperature generator 5 pass through the third tube 15, the refrigerant which is heat-exchanged in the low temperature generator 4 is supplied to the condenser 3. The supplied refrigerant absorbs the reaction heat in the absorber 2 so as to decrease the temperature of the solution within the absorber, and is then cooled and condensed by the flowing cooling water so as to be supplied to the evaporator 1 in a liquefied state. Further, the concentrated solution is passed through the low temperature generator 6 and is absorbed while being sprayed over the absorber 2.

A controller (not shown) which is installed inside the high temperature generator 5 controls the solution pump 10 in accordance with the temperature level of the solution within the high temperature generator 5 so as to adjust an amount of solution which is sent to the high temperature generator 5. As such, the concentrated solution is supplied to the absorber 2 so as to again absorb the refrigerant steam, and such a process is repeated.

In the conventional absorption chiller having such a construction, however, a double-effect chiller using high-temperature steam as a heat source and a single-effect chiller using medium-temperature water as a heat source are independently developed and used. Therefore, a cost of developing a chiller is doubled, and the chiller equipments in industrial processes become complicated. Further, the respective chillers should be installed, resulting in an excessive equipment cost.

SUMMARY OF THE INVENTION

An advantage of the present invention is that it provides a hybrid absorption chiller in which generators which respectively use high-temperature steam and medium-temperature water, generated in an industrial process, as a heat source are installed so as to generate refrigerant at the same time, so that the production of refrigerant can be increased, various types of operation modes can be selected, and waste heat can be effectively utilized.

According to an aspect of the invention, a hybrid absorption chiller, which uses high-temperature steam and medium-temperature water generated in industrial processes as a heat source, includes a high temperature generator that uses the high-temperature steam as a heat source so as to separate a refrigerant from a dilute lithium bromide solution (weak solution) coming out of an absorber; a low temperature generator that uses the heat of condensation of the refrigerant steam, generated in the high temperature generator, as a heat source so as to again separate a refrigerant from the lithium bromide solution concentrated in the high temperature generator; a generator for medium temperature water that uses the medium-temperature water as a heat source so as to separate a refrigerant from the dilute lithium bromide solution (weak solution) coming out of the absorber; a hybrid condenser that simultaneously condenses the refrigerants which are respectively generated in the high temperature generator, the low temperature generator, and the generator for medium temperature water; an evaporator that uses the latent heat of vaporization of the refrigerant condensed in the hybrid condenser so as to obtain chilled water; an absorber that receives a concentrated solution from the low temperature generator and the generator for medium temperature water and absorbs the refrigerant evaporated by obtaining latent heat of vaporization in the evaporator so as to produce a dilute lithium bromide solution; and solution pumps that are installed in both sides of the absorber so as to supply the weak solution produced in the absorber to the high temperature generator and the generator for medium temperature water, respectively.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Hereinafter, preferred embodiments of the present invention will be described in detail with reference to the accompanying drawings.

Figure 2:
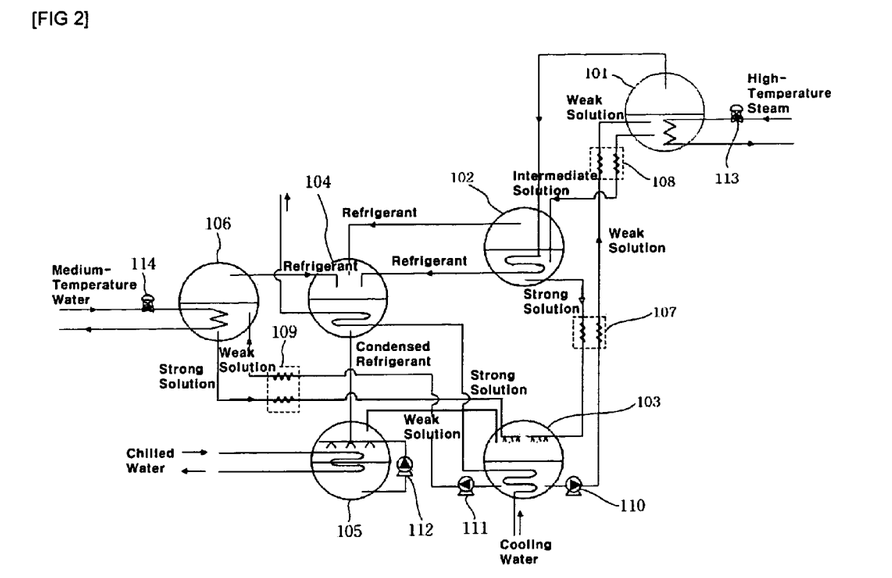
FIG. 2 is a conceptual view schematically showing the structure of a hybrid absorption chiller according to the present invention.

FIG. 2 is a conceptual view schematically showing the structure of a hybrid absorption chiller according to the present invention. The hybrid absorption chiller shown in FIG. 2 is composed of a high temperature generator 101 which generates a refrigerant by using high temperature steam as a heat source, a low temperature generator 102 which generates a refrigerant by using heat of condensation of the refrigerant steam generated in the high temperature generator 101, a generator for medium temperature water 106 which generates a refrigerant by using medium temperature water as a heat source, a hybrid condenser 104 which simultaneously condenses the refrigerants, generated in the high temperature generator 101, the low temperature generator 102, and the generator for medium temperature water 106, an evaporator 105 which obtains chilled water by using latent heat of vaporization of the condensed refrigerants, an absorber 103 which can simultaneously supply liquid to both the high temperature generator 101 and the generator for medium temperature water 106, and a solution pump.

The solution pump is composed of a double-effect solution pump 110 and single-effect solution pump 111, which are respectively installed in the absorber 103. The double-effect solution pump 110 and the single-effect solution pump 111 respectively supply a weak solution to the high temperature generator 101 and the generator for medium temperature water 106.

As shown in FIG. 2, a low-temperature solution heat exchanger 107 is constructed so that the heat exchange between the weak solution entering the high temperature generator 101 and the strong solution coming out of the low temperature generator 102 can be carried out.

Further, a high-temperature solution heat exchanger 108 is constructed so that the heat exchange between the weak solution entering the high temperature generator 101 and the intermediate solution coming out of the high temperature generator 101 can be carried out.

In addition, a medium-temperature solution heat exchanger 109 is constructed so that the heat exchange between the weak solution entering the generator for medium temperature water 106 and the strong solution coming out of the generator for medium temperature water 106 can be carried out.

The present invention having such a construction is a hybrid absorption chiller which simultaneously uses high-temperature steam and medium temperature water, which are inevitably generated in industrial processes, as a heat source. The hybrid absorption chiller carries out a main cooling capacity through a double effect of the high temperature generator 101 and low temperature generator 102 which use high-temperature steam as a heat source and carries out a partial cooling capacity through a single effect of the generator for medium temperature water 106 which uses medium temperature water as a heat source. The hybrid absorption chiller can be operated in the following various types of operation modes.

(1) Individual Driving Through Double Effect

In the hybrid absorption chiller of the invention, a double-effect absorption chiller cycle works as follows, when the cooling capacity which is required in industrial processes can be sufficiently achieved only by high-temperature steam serving as a heat source.

The double-effect absorption chiller cycle works in a state where the single-effect solution pump 111 sending a weak solution to the generator for medium temperature water 106 and a medium-temperature water supply control valve 114 supplying medium-temperature water are closed.

The working procedure is as follows. As the double-effect solution pump 110 provided in one side of the absorber 103 is operated, the weak solution within the absorber 103 is supplied to the high temperature generator 101. At this time, the weak solution is referred to as a mixture of lithium bromide as a kind of absorbent and water (steam) as a refrigerant.

Then, the weak solution supplied to the high temperature generator 101 comes in contact with a heat exchange supply pipe (tube) for supplying high-temperature steam so as to be divided into refrigerant steam and an intermediate solution. At this time, the evaporated refrigerant steam is passed through a transfer pipe so that the heat of condensation thereof is transmitted through a heat exchanger to generate a refrigerant in the low temperature generator 102. Then, the refrigerant steam is supplied to the hybrid condenser 104.

The intermediate solution coming out of the high temperature generator 101 is supplied to the low temperature generator 102 through a separate transfer pipe, and comes in contact with a heat exchange transfer pipe, through which the refrigerant steam generated in the high temperature generator 101 passes, so as to be heat-exchanged.

The transfer pipe connected to the low temperature generator 102 is provided with the high-temperature solution heat exchanger 108 for the heat exchange between the high-temperature intermediate solution coming out of the high temperature generator 101 and the weak solution supplied to the high temperature generator 101.

The intermediate solution is once again divided into refrigerant steam and a strong solution through the heat exchange with the refrigerant steam generated by the high temperature generator 101. The refrigerant steam is supplied to the hybrid condenser 104 through a separate transfer pipe so as to be condensed by cooling water, and the strong solution is sent to the absorber 103 through a separate transfer pipe.

The transfer pipe connected to the absorber 103 is provided with the low-temperature solution heat exchanger 107 for the heat exchange between the strong solution and the weak solution supplied to the high temperature generator 101.

In other words, the refrigerants which are respectively generated in the high temperature generator 101 and the low temperature generator 102 are simultaneously supplied into the hybrid condenser 104.

The hybrid condenser 104 is provided with a cooling water pipe passing therethrough via the absorber 103. The refrigerant coming in contact with the cooling water pipe gives up heat of condensation to cooling water, and is then condensed. After being supplied to the evaporator 105, the condensed refrigerant is sprayed over a chilled water pipe, to which chilled water is supplied through a separate refrigerant pump 112, and takes the latent heat of vaporization, while decreasing the temperature of the chilled water. Then, the refrigerant is evaporated so as to be absorbed into the absorber 103 through a separate transfer pipe.

The refrigerant steam absorbed into the absorber 103 is absorbed into the strong solution supplied by the low temperature generator 102 so as to be recycled in a weak-solution state.

The water chilled in the evaporator 105 is supplied to various equipments in which cooling is needed, and carries out a cooling action.

(2) Simultaneous Driving of Double Effect and Single Effect

In the hybrid absorption chiller of the invention, when a required cooling capacity cannot be satisfied only by the double effect because of a short supply of high-temperature steam, a double-effect cycle using high-temperature steam as a heat source works at partial load, and a single-effect cycle using medium-temperature water as a heat source works at the same time.

At this time, if medium-temperature water is supplied (that is, the single effect) in a state where a required cooling capacity is satisfied only by the double effect, a steam supply control valve 113 reduces a supply of steam according to a change in temperature of the exit of chilled water, that is, the amount of refrigerant generated in the generator for medium temperature water 106.

The double-effect cycle in the above-described simultaneous operation mode works the same as described in the double-effect absorption chiller cycle, and the single-effect solution pump 111 and the medium temperature water supply control valve 114 are opened for the simultaneous driving.

Accordingly, the single effect solution pump 111 supplies the weak solution to the generator for medium temperature water 106, and the weak solution supplied to the generator for medium temperature water 106 comes in contact with the heat exchange supply pipe, to which medium-temperature water is supplied, so as to be divided into refrigerant steam and a strong solution.

Here, the refrigerant steam and the refrigerants generated in the hybrid condenser 104 through the double-effect cycle are condensed together through the heat exchange with a cooling water pipe.

At this time, the strong solution produced in the generator for medium temperature water 106 is supplied to the absorption 103.

(3) Individual Driving of Single Effect

In the hybrid absorption chiller of the invention, when a required cooling capacity can be satisfied only by the single effect using medium-temperature water or the steam supply is stopped, the operation of the double-effect solution pump 110 is stopped, and a cooling cycle of the above-described single effect works through the generator for medium temperature water 106, the hybrid condenser 104, the evaporator 105, and the absorber 103.

In the hybrid absorption chiller of the invention having the above-described construction and action, the double effect using high-temperature steam as a heat source and the single effect using medium-temperature steam as a heat source are effectively combined, and the refrigerants generated in the high temperature generator 101, the low temperature generator 102, and the generator for medium temperature water 106 are simultaneously condensed through the hybrid condenser 104.

FIGS. 3A to 3G show operation parameters for the individual driving of the double effect according to the invention.

The operation parameters are experimental values which are simulated when the hybrid absorption chiller is driven only through the double effect in a case where high-temperature steam is so sufficient that a refrigerant load can be maintained only by the high-temperature steam. The operation parameters show a tendency of the temperature and flow rate of chilled water/cooling water/high-temperature steam for driving the chiller at 3RT with respect to the time. 3RT means a capacity which can decrease the temperature of chilled water with a mass flow rate of 3000 kg/h from 25° C. to 30° C.

As seen through the experiment, it approaches a refrigeration load state of 3RT in about 60 minutes after the chiller is activated.

Figure 3A:
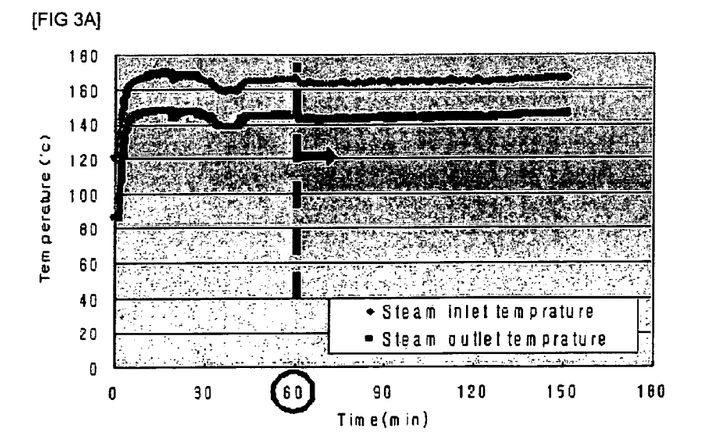
FIGS. 3A to 3G show operation parameters for individual driving of a double effect according to the invention.
Figure 3B:
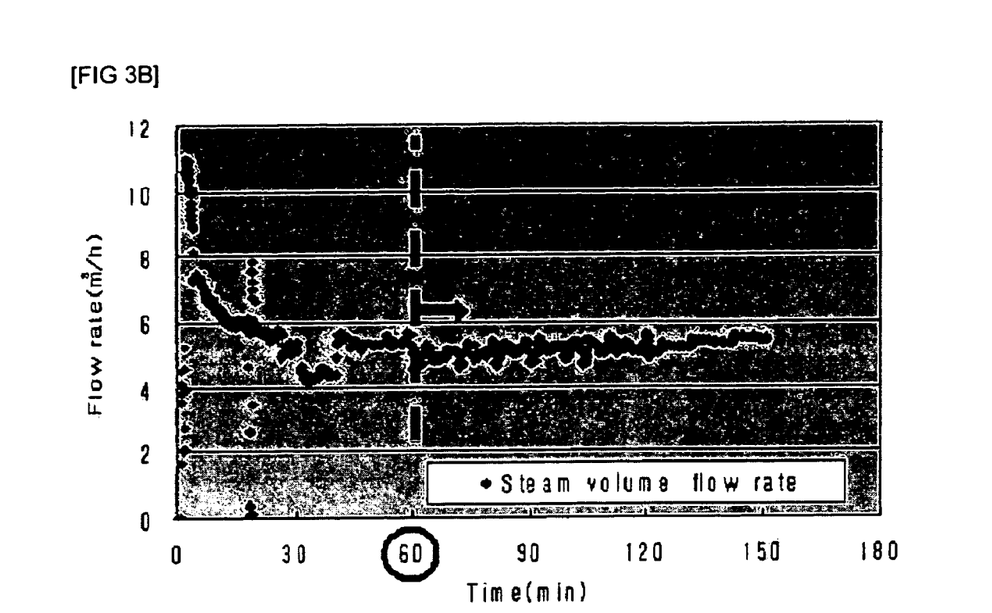
Figure 3C:
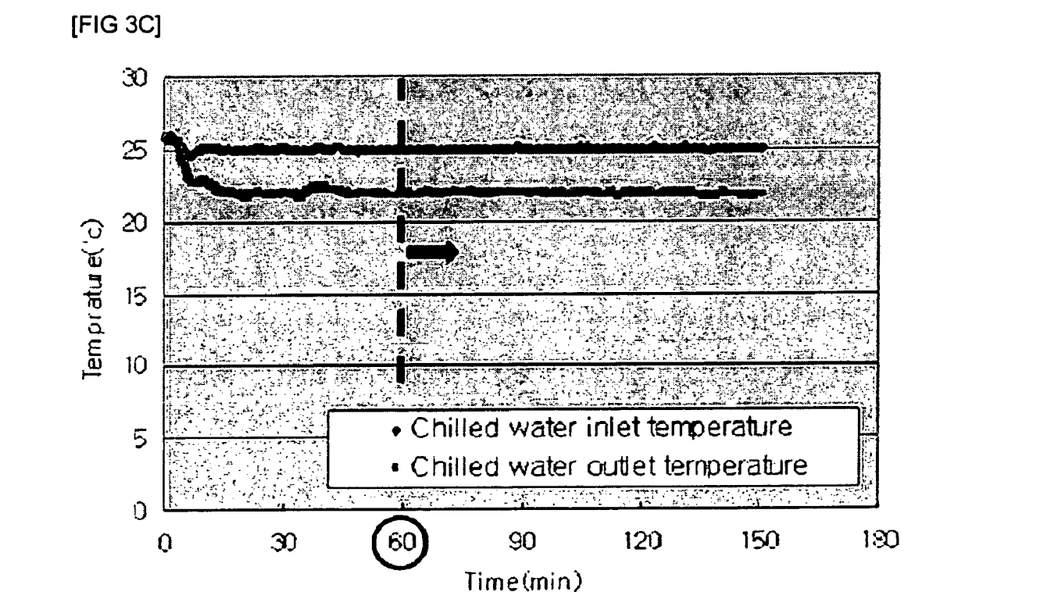
Figure 3D:
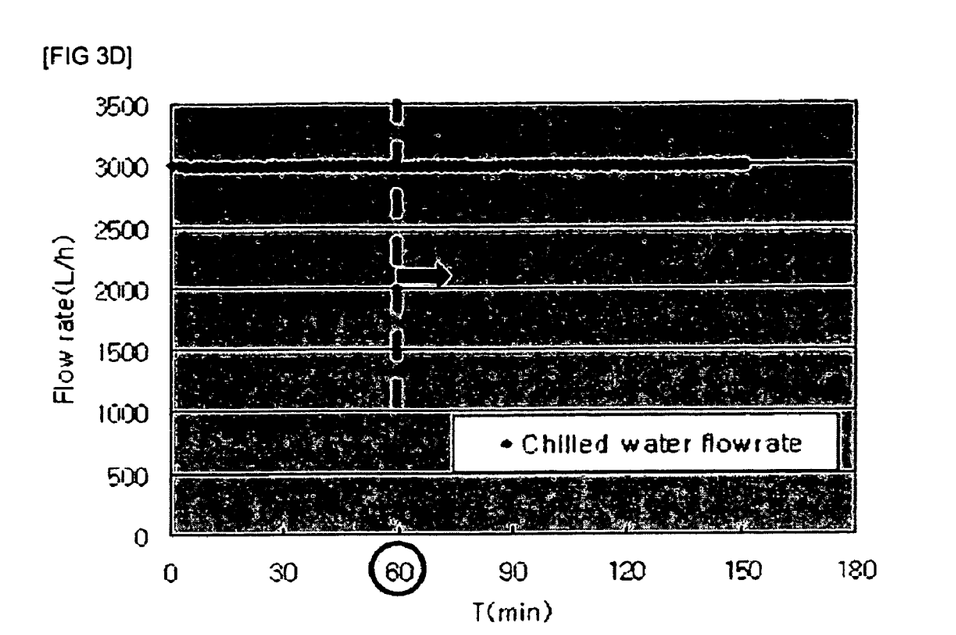
Figure 3E:
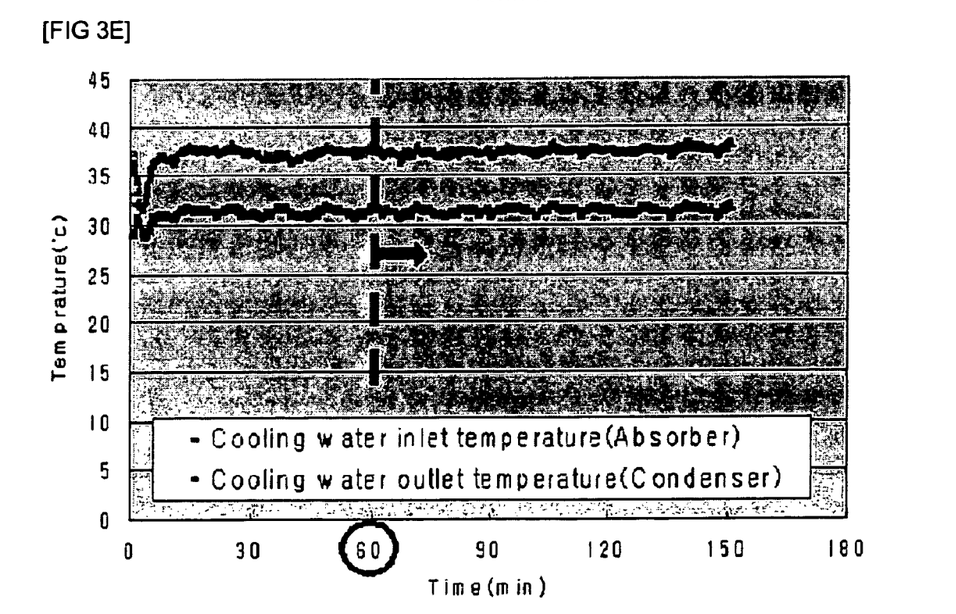
Figure 3F:
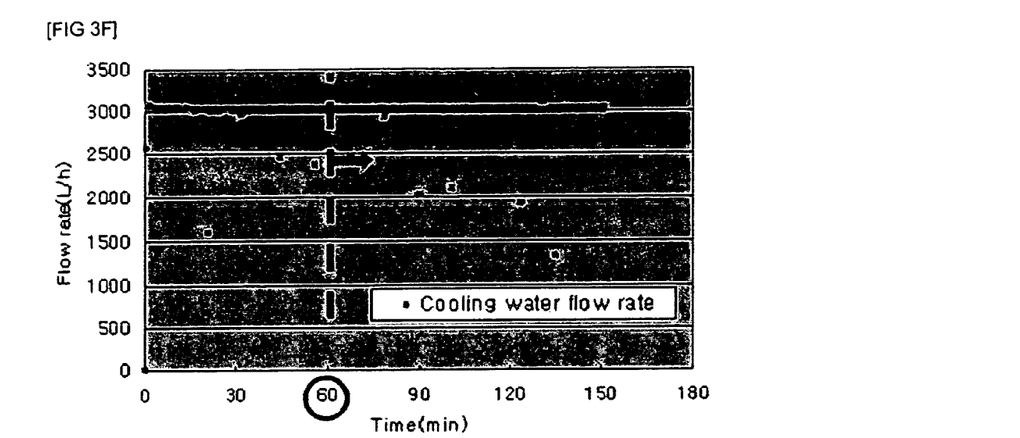

In FIG. 3A, it can be found that the temperature of steam increases little by little from a normal state, which means a nozzle controlling the flow rate of steam is influenced by the temperature of steam so that the flow path thereof extends.

Figure 3G:
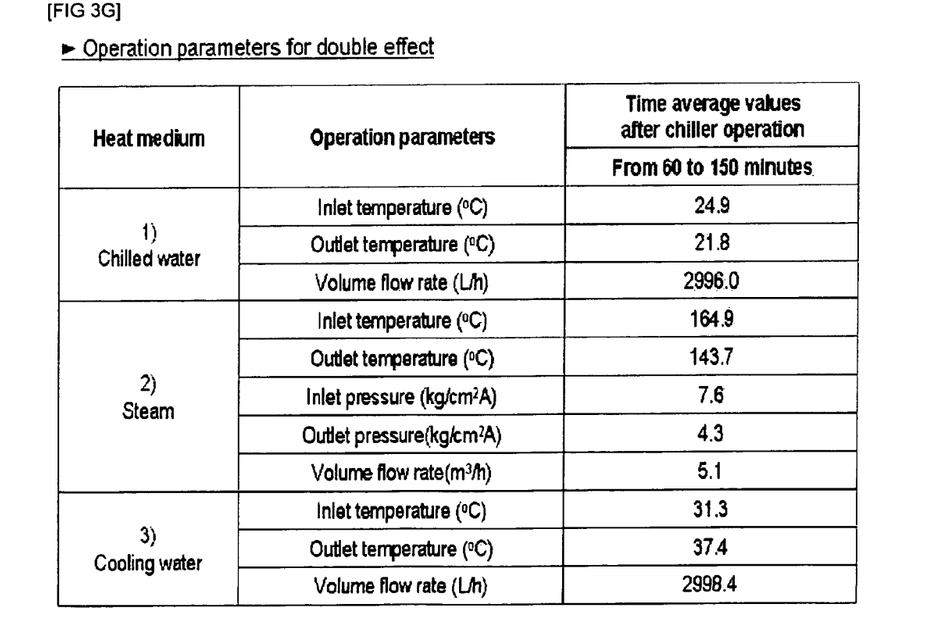

FIG. 3G show the time average values of the operation parameters from 60 minutes to about 150 minutes after the chiller is activated.

FIGS. 4A to 4I show operation parameters for a combination of the double effect and the single effect using medium-temperature water.

The operation parameters are experimental values which are simulated in a case where medium-temperature water is supplied to the generator for medium temperature water so that the double and single effects are driven at the same time, when a desired refrigerant load (3RT) cannot be maintained only by high-temperature steam.

In the above experiment, the chiller is operated only by the double effect at a refrigeration load of 2RT for 90 minutes.

After 90 minutes, medium-temperature water is supplied so that the double and single effects are driven at the same time. Then, a refrigeration load of 3RT is achieved.

Figure 4A:
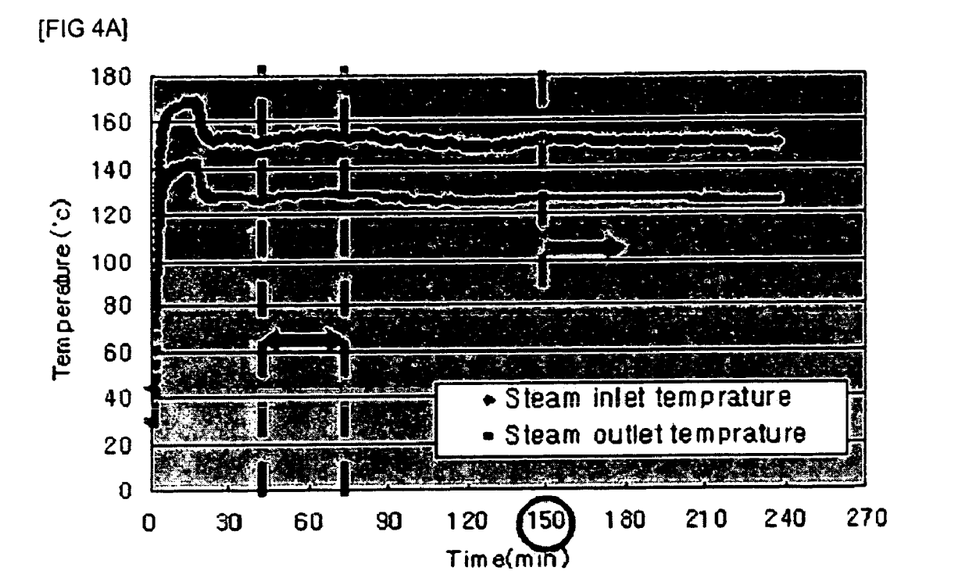
FIGS. 4A to 4I show operation parameters for a combination of the double effect and a single effect using medium temperature water.
Figure 4B:
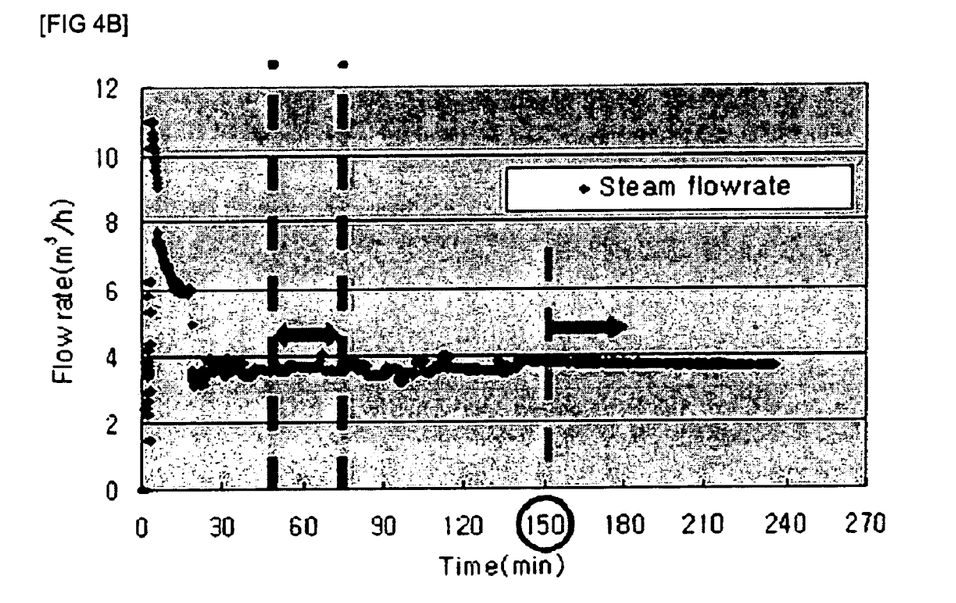
Figure 4C:
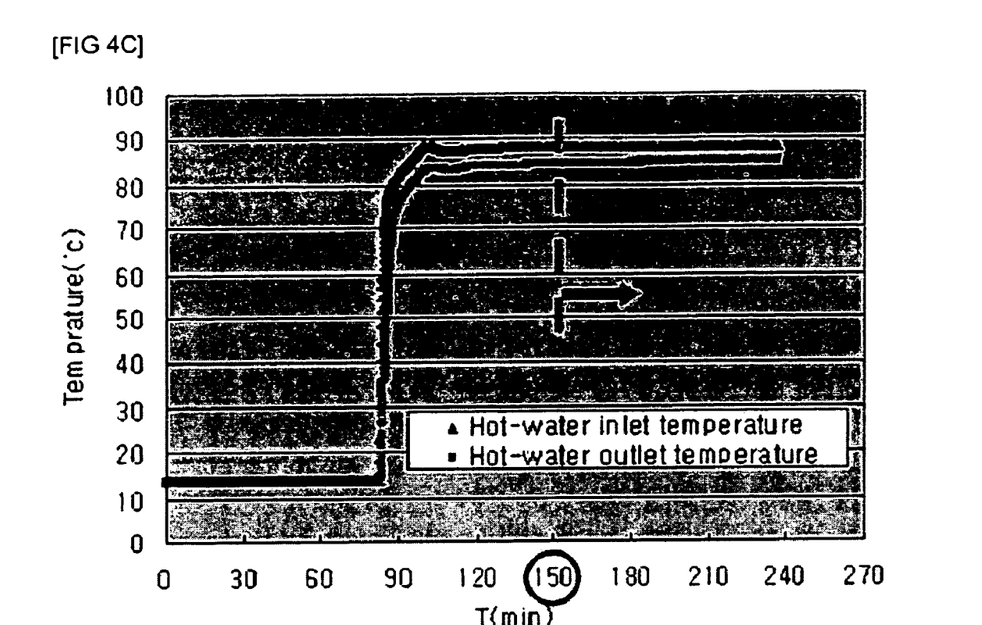
Figure 4D:
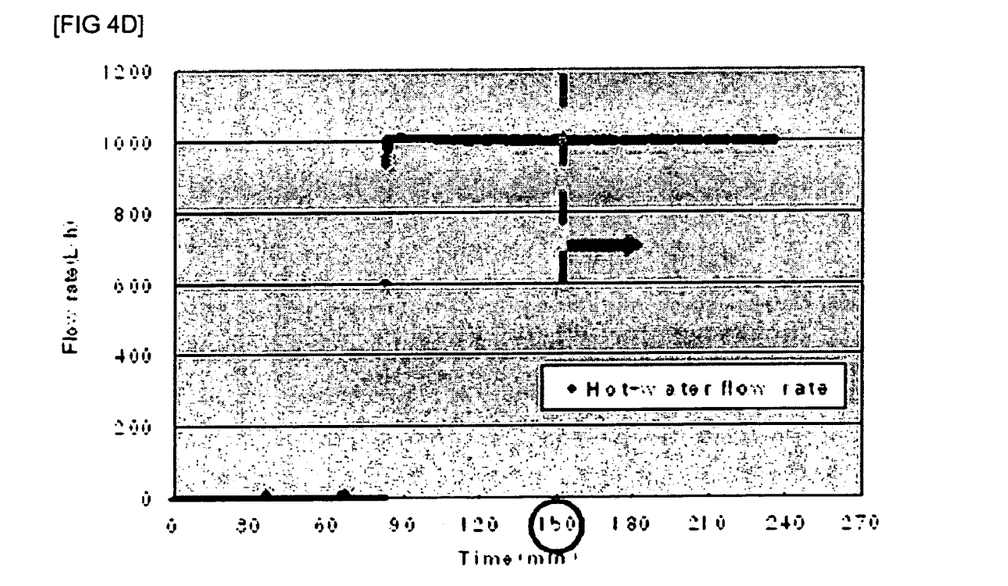
Figure 4E:
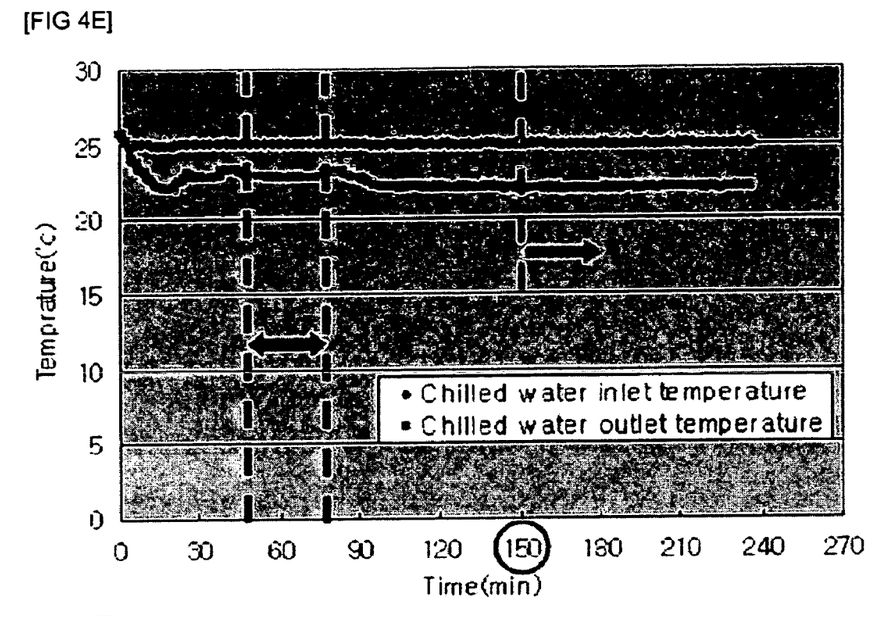
Figure 4F:
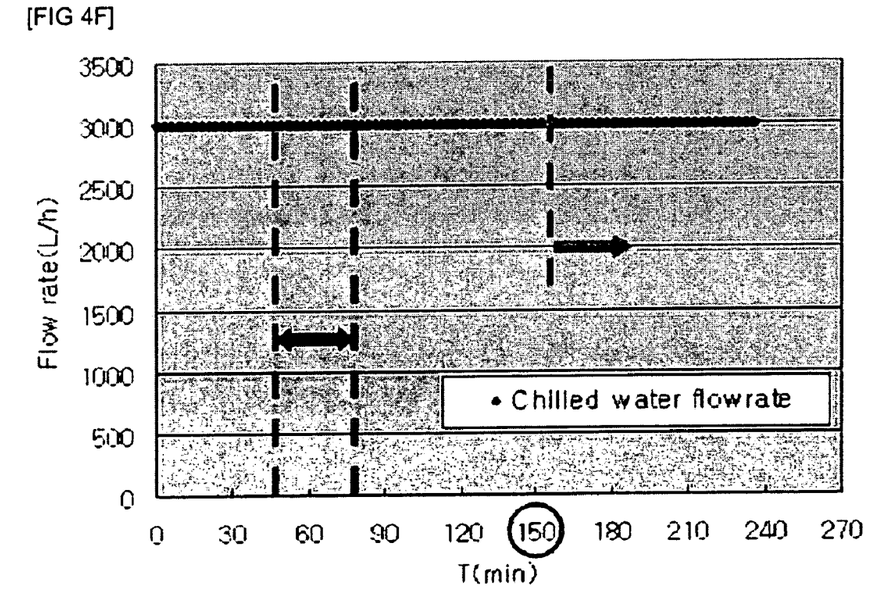
Figure 4G:
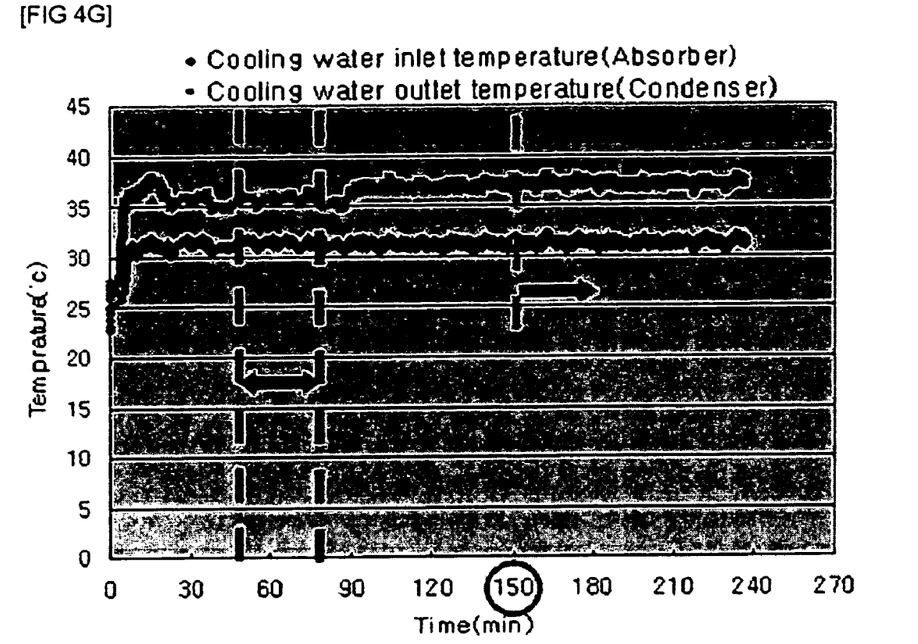
Figure 4H:
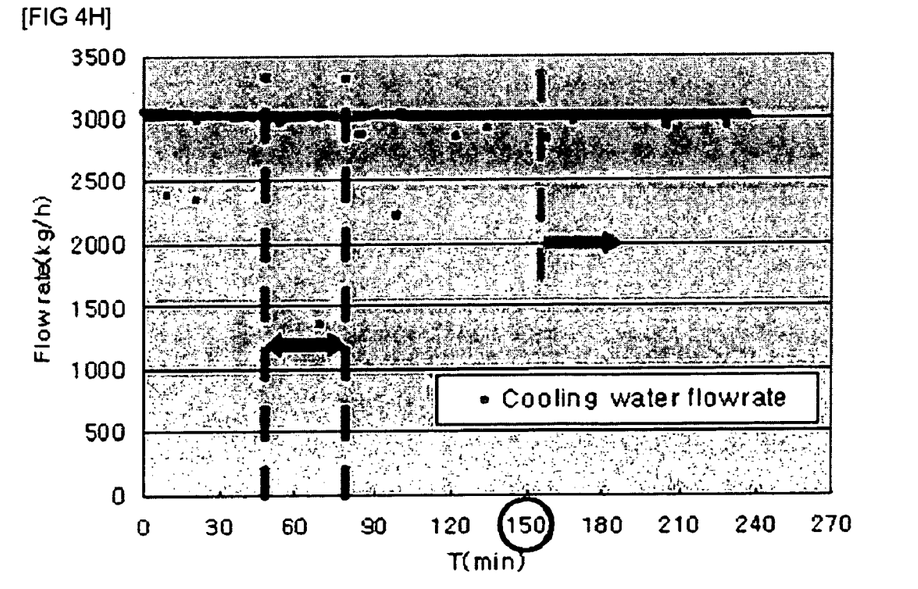

According to a change in temperature of chilled water shown in FIG. 4E, it approaches a refrigeration load state of 2RT between 45 minutes and 80 minutes, when the double effect using high-temperature steam is driven. After 90 minutes, medium-temperature water starts to be supplied to the generator for medium-temperature water. Further, after 150 minutes, it approaches a normal refrigeration load state of 3RT.

Figure 4I:
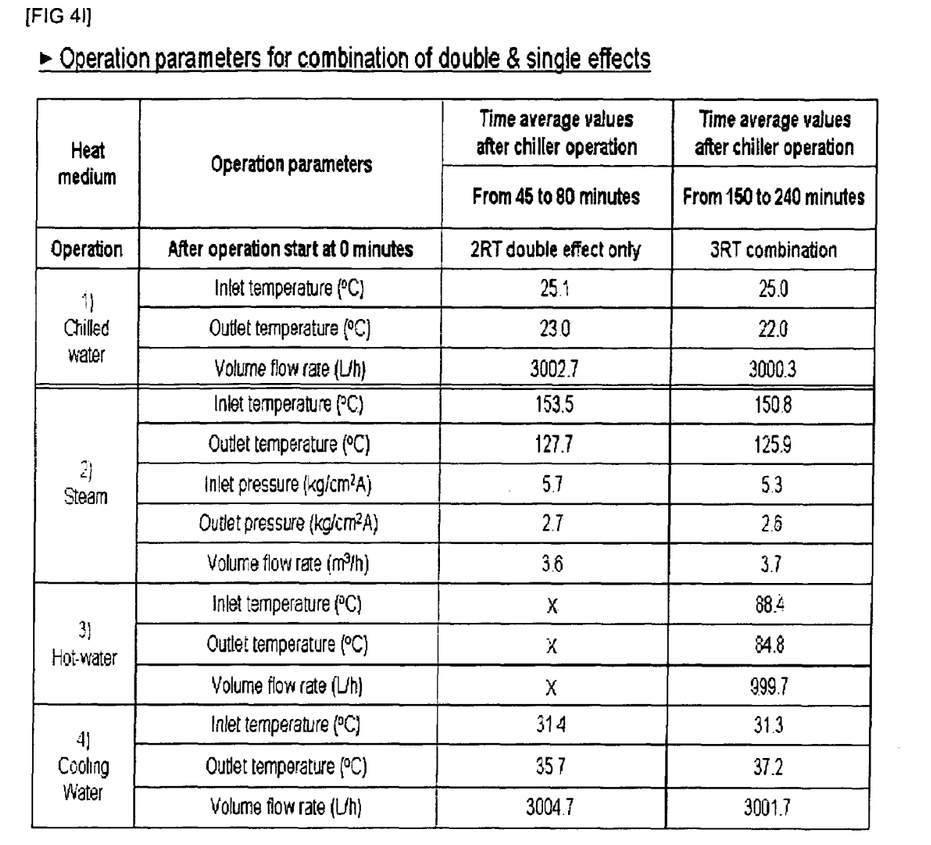

FIG. 4I shows the time average values of the operation parameters for driving the chiller at a refrigeration load of 2RT at the time of driving the double effect using high temperature steam and the time average values of the operation parameters for simultaneously driving (hybrid driving) the double and single effects so that it approaches a refrigeration load state of 3RT.

The hybrid absorption chiller according to the invention can be applied in a steel manufacturing process which is one of industrial processes, and the brief description thereof will be made as follows.

In a steel manufacturing process, a specific volume of the air increases as the atmospheric temperature increases in the summer. Further, the load of a compressor which compresses air in an air factory increases as the temperature of cooling water coming out of a cooling tower increases. Such an increase in the load of the compressor is directly related to an increase in power consumption and reduces the gas production in the process. In that case, there are many difficulties in suppressing an increase in temperature by using the cooling water generated by only a double-effect chiller at the time of lack of steam.

In the steel manufacturing process, high temperature steam (8 to 12 kgf/cm$^2$, saturated steam) and medium temperature water (90 to 100° C.) are inevitably generated. Therefore, if a hybrid absorption chiller using the above heat sources at the same time is developed, the temperature of the cooling water entering a compressor intercooler of an air factory in the steel manufacturing process can be effectively reduced, which makes it possible to reduce the amount of power consumption and to increase an available amount of gas production.

According to the present invention having such a construction, the generators are installed in accordance with the respective temperature levels of high-temperature steam and medium-temperature water, which are waste heat generated in industrial processes, so as to generate refrigerants at the same time. Therefore, the production of refrigerant is increased, and the waste heat is effectively utilized.

Further, since the plurality of heat sources are reused by one absorption chiller, the structure of the chiller is highly effective, the equipments thereof are simple, and the management of the equipments is unified. Therefore, a management cost in accordance with the maintenance can be reduced.

What is claimed is:

1. A hybrid absorption chiller, which uses high-temperature steam and medium-temperature water, the hybrid absorption chiller comprising:
    a high temperature generator that uses the high-temperature steam as a heat source so that a heat exchange for a phase separation from a weak solution is carried out to make a primary refrigerant vaporized;
    a low temperature generator that uses the heat of condensation of the primary refrigerant, generated in the high temperature generator, as a heat source so that the heat exchange to generate a secondary refrigerant is carried out;
    a generator for medium temperature water that uses the medium-temperature water as a heat source so that the heat exchange to generate a tertiary refrigerant is carried out;
    a hybrid condenser that simultaneously or selectively depending on cooling operation modes dominated by option of the heat sources condenses the primary refrigerant, the secondary refrigerant and the tertiary refrigerant respectively generated or made in the high temperature generator, the low temperature generator, and the generator for medium temperature water;
    an evaporator that uses latent heat of vaporization of the primary refrigerant, the secondary refrigerant and the tertiary refrigerant condensed in the hybrid condenser so as to obtain chilled water;
    an absorber that receives a strong solution from the low temperature generator and the generator for medium temperature water and absorbs the refrigerant evaporated by obtaining latent heat of vaporization in the evaporator so as to produce the weak solution; and
    solution pumps that are installed in both sides of the absorber so as to supply the weak solution produced in the absorber to the high temperature generator and the generator for medium temperature water, respectively.

2. The hybrid absorption chiller according to claim 1 further including a low-temperature solution heat exchanger by which heat is exchanged between the weak solution entering the high temperature generator and the strong solution coming out of the low temperature generator.

3. The hybrid absorption chiller according to claim 1 further including a high-temperature solution heat exchanger by which heat is exchanged between the weak solution entering the high temperature generator and an intermediate solution coming out of the high temperature generator.

4. The hybrid absorption chiller according to claim 1 further including a medium-temperature solution heat exchanger by which heat is exchanged between the weak solution entering the generator for medium-temperature water and the strong solution coming out of the generator for medium-temperature water.

5. The hybrid absorption chiller according to claim 1, wherein the weak solution coming out of the absorber is supplied to the high temperature generator to generate the primary refrigerant, and the intermediate solution which has been heat-exchanged enters the low temperature generator to generate the secondary refrigerant.

6. The hybrid absorption chiller according to claim 1, wherein a steam supply control valve operates in accordance with a change in temperature of the exit of chilled water.

7. The hybrid absorption chiller according to claim 1, wherein a double-effect cycle using the high-temperature steam as a heat source is driven so as to carry out a main cooling capacity, and a single-effect cycle using the medium-temperature water as a heat source is driven so as to carry out a partial cooling capacity.

8. The hybrid absorption chiller according to claim 7, wherein the double-effect cycle using high-temperature steam as a heat source is individually driven.

9. The hybrid absorption chiller according to claim 7, wherein the single-effect cycle using medium-temperature water as a heat source is individually driven.

10. The hybrid absorption chiller according to claim 7, wherein the double-effect cycle using high-temperature steam as a heat source and the single-effect cycle using medium-temperature water as a heat source are driven at the same time.

* * * * *